United States Patent
Schneider et al.

(10) Patent No.: US 8,239,161 B2
(45) Date of Patent: Aug. 7, 2012

(54) MEASURING DEVICE WITH TWO-CHANNEL SAMPLING

(75) Inventors: Michael Schneider, Constance (DE); Peter Brügger, Frauenfeld (CH); Amer Tarraf, Kreuzlingen (CH)

(73) Assignee: Baumer Electric AG, Frauenfeld (CH)

( * ) Notice: Subject to any disclaimer, the term of this patent is extended or adjusted under 35 U.S.C. 154(b) by 367 days.

(21) Appl. No.: 12/429,422

(22) Filed: Apr. 24, 2009

(65) Prior Publication Data

US 2009/0276180 A1 Nov. 5, 2009

(30) Foreign Application Priority Data

Apr. 30, 2008 (EP) .................................. 08008308

(51) Int. Cl.
*G01C 1/00* (2006.01)
*G01C 9/00* (2006.01)
(52) U.S. Cl. ........................................ 702/151; 702/94
(58) Field of Classification Search .................. 702/151, 702/154, 94
See application file for complete search history.

(56) References Cited

U.S. PATENT DOCUMENTS

| 4,466,189 A * | 8/1984 | Tobin, Jr. ......................... 33/267 |
| 6,848,187 B2 * | 2/2005 | Ito et al. ......................... 33/1 PT |
| 7,359,776 B2 * | 4/2008 | Souda .......................... 701/29.7 |
| 2004/0217943 A1 * | 11/2004 | Kim ............................... 345/161 |

FOREIGN PATENT DOCUMENTS

| EP | 1571426 A2 | 9/2005 |
| JP | 10239104 A | 9/1998 |
| WO | 2005078403 A2 | 8/2005 |

* cited by examiner

*Primary Examiner* — Manuel L Barbee
(74) *Attorney, Agent, or Firm* — IP Strategies

(57) ABSTRACT

The present invention relates to a shaft encoder device, comprising magnetic sensor means designed to detect the magnetic field of a magnetic field generating means stationary with respect to the shaft, a light source, optical sensor means designed to detect light emitted from the light source and reflected or transmitted by an encoder disk stationary with respect to the shaft, and signal processing means designed to receive first data from the magnetic sensor means and second data from the optical sensor means, and to determine an angle of rotation of the shaft from the received first data and/or to determine the angle of rotation of the shaft from the received second data.

8 Claims, 2 Drawing Sheets

MEASURING DEVICE WITH TWO-CHANNEL SAMPLING

FIELD OF THE INVENTION

The present invention relates to a measuring device for determining the position and/or the angle of rotation of a body that carries out a translatory and/or a rotary motion, in particular a shaft encoder for measuring the rotation of a shaft rotating about an axis of rotation, and furthermore in particular a two-channel sampling of a rotating shaft for securely determining the angle of rotation of the shaft.

BACKGROUND OF THE INVENTION

Measuring devices, such as shaft encoders for determining angular positions of moving axes or shafts by contactless single or multiturn sampling, are already generally used for monitoring and controlling mechanical motion sequences. Shaft encoders are, for example, employed for detecting the speed of motors and controlling the same, for the open-loop or closed-loop control of transport systems, or for monitoring conveyor belts. However, recently the demands on the accuracy, and in particular on the reliability, of the shaft encoders have considerably increased to be able to satisfy current safety standards and controlling tasks in plant and mechanical engineering applications.

In the applications of shaft encoders which are sometimes very demanding as regards ambient conditions, soiling and/or wear effects can result in non-tolerable faulty measurements or even a partial or total failure of a shaft encoder. Therefore, it is imperative to improve the reliability of existing shaft encoder systems, however not without taking into consideration economic and constructional conditions.

In prior art, two-channel shaft encoder systems are known which use two separate measuring means for one and the same shaft to increase safety by a redundant measurement of the angle of rotation. The technical efforts as well as the costs for a shaft encoder system are naturally significantly increased thereby. Moreover, the incorporation of several housings for individual measuring means can be constructionally disadvantageous or even impossible.

It is therefore an object underlying the present invention to provide a shaft encoder device showing increased reliability of the measured values obtained, at the same time maintaining a construction as simple as possible and as little impeding as possible with units that can be incorporated as simply as possible and in a manner as little impeding as possible.

BRIEF SUMMARY OF THE INVENTION

The above-mentioned object is achieved by the shaft encoder (rotary encoder) device for sampling a rotating shaft according to claim 1, comprising
magnetic sensor means designed to detect the magnetic field of magnetic field generating means stationary with respect to the shaft and in particular fixed thereto;
a light source;
optical sensor means designed to detect light emitted from the light source and reflected or transmitted by an encoder disk stationary with respect to the shaft and in particular fixed thereto; and
signal processing means designed to receive first data from the magnetic sensor means and second data from the optical sensor means and to determine an angle of rotation of the shaft from the received first data and/or to determine the angle of rotation of the shaft from the received second data.

The concept "shaft" herein comprises a rotating, merely mechanically or electrically driven axle, and also in general any rotating, straight, curvilinear or helical solid or hollow body, of which the angle of rotation is detected by the measuring means. The shaft can be, for example, a hollow shaft or a solid shaft. The magnetic field generating means can be, for example, a permanent magnet or a magnetic field generating coil. Moreover, as a synonym for the term "magnetic field generating means", the simpler term "magnet" will also be used.

Moreover, it will be understood that the first angle of rotation determined by the signal processing means on the basis of the first data from the magnetic sensor means does not have to be exactly in conformity with the second angle of rotation determined on the basis of the second data from the magnetic sensor means as the sensor means can have different accuracies and/or fault tolerances.

The actual ("real") angle of rotation of the shaft can thus be determined, according to the invention, two times and independently of each other, namely on the one hand by means of magnetic sensor means and on the other hand by means of optical sensor means, and thus on the basis of physically different principles. The data of the optical sensor means are input into the signal processing means in one of at least two data channels, and the data of the magnetic sensor means are input into the signal processing means in another one of the at least two data channels.

In case of a failure or impairment of one of the sensor means, the required information about the angle of rotation of the shaft can thus be provided by means of the other sensor means. Moreover, the reliability of the measurements can be ensured by continuously matching the values for the angle of rotation of the shaft determined on the basis of the first data and on the basis of the second data. In particular, in a faultless operation, the values for the determined angle of rotation should be in either case (that means on the basis of the data of the optical sensor means on the one hand, and on the basis of the data of the magnetic sensor means on the other hand) within predetermined fault tolerances.

Here, it is of particular importance that the angle of rotation is determined in two different manners, i.e. based on two different physical measuring processes, so that systematic errors due to one physical measuring method can be compensated by the other measuring method. While in this description the combination of magnetic and optical sensor means is discussed more in detail, other combinations of two or several sensor means in accordance with the invention are also possible, as long as they realize a measurement of the angle of rotation of a shaft based on different physical measuring methods (cf. below).

The signal processing means of the shaft encoder device disclosed herein for sampling a rotating shaft can determine an angle of rotation of the shaft relative with respect to an original angular position of the shaft, and/or an angle of rotation of the shaft absolute with respect to an original relative position of the shaft. The relative angle here is the angle, for example measured incrementally, in the sense of rotation of the shaft measured from the original angular position within one complete rotation by 360°, while the absolute angle contains the total of the complete rotations. If the shaft has rotated about its axis of revolution exactly two times starting from the original angular position, the actual relative angle is 0° and the actual absolute angle is 720°. Here, the respective sensor means (optical and magnetic) or the signal processing means can comprise means for determining the number of complete rotations of the sampled shaft.

A particular compact construction permits a further embodiment in which the shaft encoder device comprises a housing in which the magnetic sensor means as well as the optical sensor means are arranged.

According to an advantageous further embodiment, the shaft encoder device according to the invention furthermore comprises selection means designed to cause the signal processing means to determine the angle of rotation of the shaft selectively from the received first data and/or from the received second data.

The magnetic and the optical sensor means comprise different advantages and disadvantages. Thus, for example depending on the current operational conditions (temperature, interferences, action time, etc.), one of the methods can in general operate more reliably than the other one.

The magnetic sensor means is, for example, relatively insensitive with respect to local dirt deposits and impacts on the shaft. However, magnetic interference fields can have a negative influence on the accuracy of the measurement. On the other hand, the accuracy of measurement of the angle of rotation by means of the encoder disk stationary with the shaft can suffer in case of irregular impacts of the shaft and dirt deposits on the shaft. If there are no such disturbances, very fine bar codes that can be vapor-deposited, etched or printed onto an encoder disk made of glass, plastics or metal material, permit high measurement resolutions.

The selection means can be designed, for example, to cause the signal processing means (8, 9), on the basis of determined operating states, in particular the temperature, the supply voltage, the operating time at least of the magnetic sensor means or the optical sensor means, to determine the angle of rotation of the shaft (2) selectively from the received first data and/or from the received second data. For this, detection means for checking the light beam of the optical sensor means or the intensity of the magnetic field generated by the magnet can be provided. Naturally, data about the light beam and the magnetic field can also be transmitted to the selection means by the optical and magnetic sensor means.

Thus, the shaft encoder device can advantageously comprise operational conditions determining means for the determination of operational conditions, such as dirt deposits or the load of the shaft (e.g. via the determined speed of a motor), general mechanical parameters, but also data about work tolerances, to be able to adjust them to faulty assemblies, and then the selection means can be designed so as to cause the signal processing means, on the basis of the data supplied by the operational conditions determining means, to determine the angle of rotation of the shaft from the received first data, from the received second data, or from the received first data as well as from the received second data.

Furthermore, the operational conditions determining means can provide the selection means with data indicating under which conditions which of the optical and magnetic sensor means is to be used for further data processing. Here, it can in particular transmit information about fault tolerances and the observation of the same to the selection means.

The operational conditions determining means is thus designed to obtain operational conditions data by means of which the selection means can be controlled.

In one advantageous further embodiment, the shaft encoder device comprises operational conditions determining means designed such that it obtains the operational conditions data from a comparison of the angle of rotation determined from the first data and the angle of rotation determined from the second data.

In particular, the selection means can be designed to cause the signal processing means to determine the angle of rotation of the shaft by averaging the data supplied by the optical sensor means and by the magnetic sensor means, or by averaging the angle of rotation determined by means of the first data (from the optical sensor means) and the angle of rotation determined by means of the second data (from the magnetic sensor means) to provide an averaged angle of rotation for further processing (e.g. monitoring, open-loop or closed-loop control). Such averaging can be accomplished by means of weighting which in turn can be accomplished depending on current operational conditions determined by corresponding means.

While optical sensor means and magnetic sensor means are comprised of the above further embodiments of the shaft encoder device according to the invention, in principle other sensor (detection) means which obtain data about the angle of rotation in physically different manners can also be employed. Thus, here, too, a shaft encoder device for sampling a shaft is provided, comprising first detection means designed to obtain first data about an angle of rotation of the shaft in a first manner;

second detection means designed to obtain second data about the angle of rotation of the shaft in a second manner that differs from the first manner;

signal processing means designed to receive the first data from the first detection means and the second data from the second detection means and to determine a (first) angle of rotation of the shaft from the received first data, and a (second) angle of rotation of the shaft from the received second data.

By the data being obtained in physically different manners, the desired increased reliability of the measurements is ensured. The first detection means can be, for example, selected from the group of potentiometric angle of rotation detection means, inductive angle of rotation detection means, or capacitive angle of rotation detection means, as they are known in prior art, and the second detection means can correspondingly be other angle of rotation detection means of this group, or optical or magnetic sensor means, as described above.

In this shaft encoder device according to the invention, as well as in the above-described further embodiments of the shaft encoder device with optical and magnetic sensor means, in each case more than two of the corresponding sensor (detection) means can be included and used to further increase redundancy. In particular, three or more sensor (detection) means can be included which each realize different physical measuring methods.

Potentiometric angle of rotation detection means comprise rotary potentiometers where the path of resistance consists of a wound wire filament, a carbon film, an electrically conducting plastic layer, or a combination of a resistance wire with applied electrically conducting plastic layer. With wound wire tracks, the slider jumps from one helix to the next one, so that the resistance values change discontinuously.

With inductive angle of rotation detection means, the change of the angle is detected via a change of the measuring inductance which is accomplished via the permeability, by shifting an iron core in the coil depending on the path or angle, or via the number of turns N, similar to the potentiometric shaft encoders with a sliding contact. In both methods, the angle is determined by measuring an individual inductance. Arrangements of several coils can be employed where the mutual inductances change with respect to each other corresponding to their positions. Such differential measuring methods are advantageous over the measurement of an individual inductance in that they are more insensitive with respect to influences of temperature, magnetic interference fields and variations of the measuring voltage.

Capacitive angle of rotation detection means operate according to the principle of the variable capacitor. By changing the area A, the capacity C is changed. For example, differential capacitors which consist of one rotor and two separate stator plates can be used.

The features of the individual further embodiments described above in connection with the shaft encoder device comprising optical sensor means and magnetic sensor means (measurement of the relative and/or absolute angle of rotation; incorporation of the detection means into one individual housing, use of selection means and/or operational conditions determining means, etc.) can be correspondingly also included in the shaft encoder device with generally first and second detection means.

All further embodiments of the shaft encoder device can be designed such that they can switch between a measuring mode to determine the angle of rotation and a diagnostic mode to diagnose at least the optical sensor means or the magnetic sensor means. Thus, by regular or irregular automatic switching, or switching caused by the user from the measuring mode (operating mode) to the diagnostic mode, the operativeness of the optical sensor means or of the magnetic sensor means, or of both at the same time, can be determined, and depending on the result of the diagnosis, the one or the other sensor means can be used, or both can be used.

The above-described examples can naturally be analogously transferred to devices for measuring translatory motions of bodies. Thus, there is provided
a measuring device for the determination of the position and/or the angle of rotation of a body that carries out a translatory and/or a rotary motion, comprising
first detection means designed to obtain first data about the position and/or the angle of rotation of the body by means of a first physical measuring method,
second detection means designed to obtain second data about the position and/or the angle of rotation of the body by means of a second physical measuring method that differs from the first physical measuring method,
signal processing means designed to receive the first data from the first detection means and the second data from the second detection means, and to determine the position and/or the angle of rotation of the body from the first and/or the second data.

The first and the second physical measuring methods can here be a measuring method selected from the group consisting of optical measuring methods, magnetic measuring methods, inductive measuring methods, capacitive measuring methods and potentiometric measuring methods.

It will be understood by the person skilled in the art that a measurement of degrees of angle in rotary motions is to be correspondingly replaced or supplemented, respectively, by a measurement of a translatory change of position in translatory movements.

The features of the individual further embodiments described above in connection with the shaft encoder device comprising optical sensor means and magnetic sensor means (measurement of the relative and/or absolute angle of rotation; incorporation of the detection means into one individual housing, use of selection means and/or operational conditions determining means, etc.) can be correspondingly also included in the measuring device for the determination of the position and/or the angle of rotation of a body that carries out a translatory and/or a rotary motion. Furthermore, this measuring device, too, can be designed such that it can be switched from a measuring (operative) mode to a diagnostic mode and vice versa.

All examples of the shaft encoder device according to the invention described herein can be advantageously employed in monitoring, open-loop control and closed-loop control of movable axles in mechanical engineering, in particular also in car manufacture and plant engineering. The angles of rotation determined by means of the shaft encoder device according to the invention can be used for measuring the position, speed and acceleration of movable objects, for example driven by motors, in which such a shaft encoder device is incorporated. Thus, the present invention also provides a position determining system or a path determining system or a speed determining system or an acceleration determining system or an open-loop or closed-loop control system comprising a shaft encoder device according to one of the above-described examples.

BRIEF DESCRIPTION OF THE DRAWINGS

Other features and advantages of the present invention will be described below with reference to the drawings which only illustrate embodiments by way of example and do not represent the complete scope of the invention. It will be understood that the shown features can be employed within the scope of the invention in other combinations than those described in the respective examples.

DETAILED DESCRIPTION OF THE INVENTION

Figure 1:
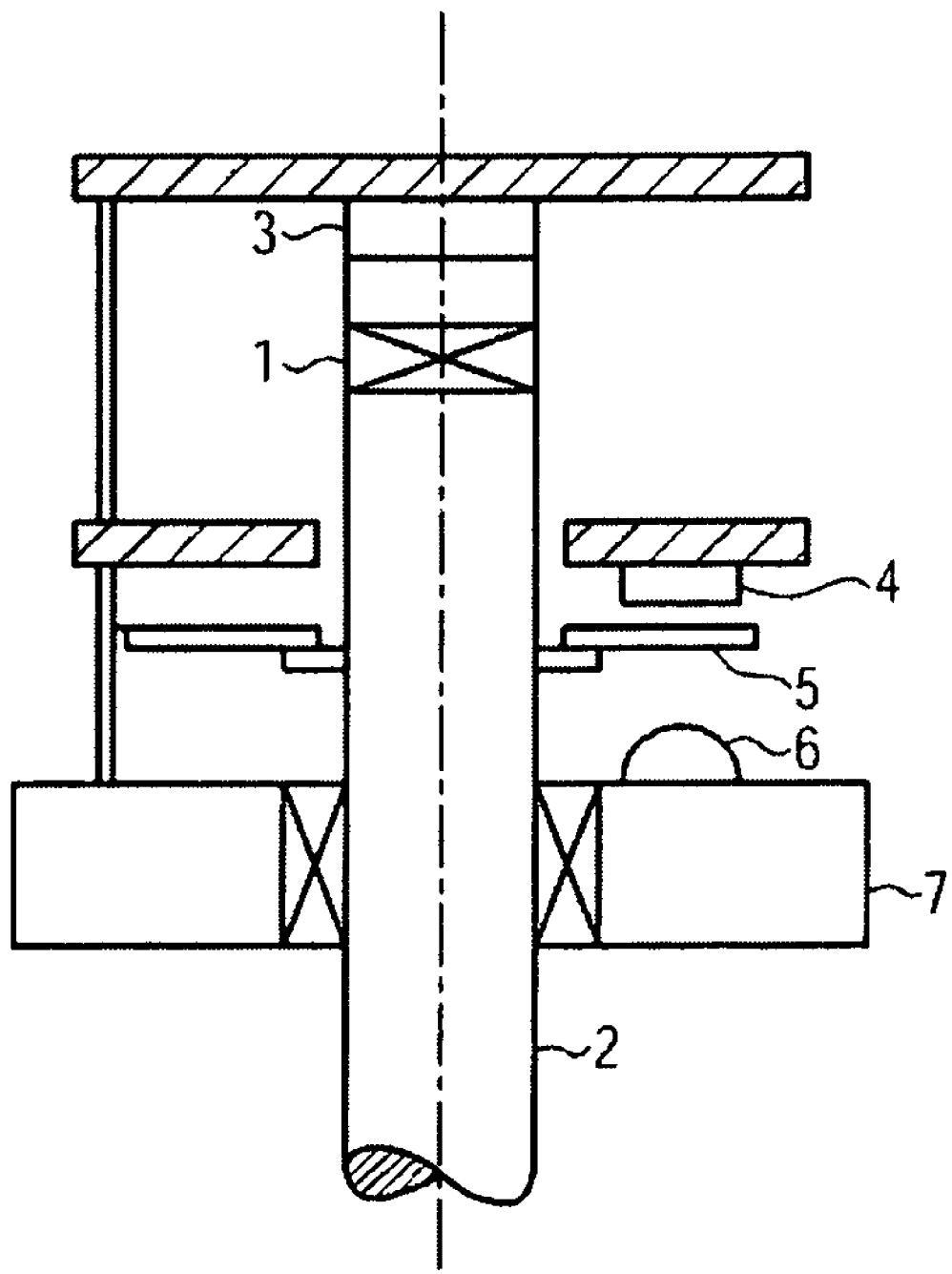
FIG. 1 shows an example of a shaft encoder with two-channel sampling according to the present invention.

In the example illustrated in FIG. 1, a shaft encoder according to the invention for sampling a rotating shaft 2 provided with a magnet 1 comprises a magnetic sensor 3, an optical sensor 4 with a user-specific circuit, an encoder disk 5 connected to the shaft 2, and a light source 6 attached to a flange 7 in which the shaft 2 is rotatably mounted. The light source 6 can comprise an LED or an incandescent lamp or the like as well as one or several lenses, and light within or outside (e.g. infrared or ultraviolet) the visible spectrum can be emitted from this light source 6.

In particular, in the shown example, the magnetic 3 and optical 4 sensors as well as the encoder disk 5 and the light source 6 are completely located in one single housing, so that the construction can be advantageously designed as concerns space requirements and compactness.

In the shown example, light emitted from the light source 6 passes through apertures provided within the encoder disk 5 rotating together with the shaft 2 and spaced at regular distances from each other to the optical sensor 4 stationary with respect to the rotating shaft 2.

Alternatively to the arrangement of sensor 4, encoder disk 5 and light source 6 shown in FIG. 1, the optical sensor and the light source can be attached on one side of an impulse encoder disk (striped disk) with reflecting and non-reflecting (white and black) segments sampled by the light beam of the light source.

The magnetic field of the magnet 1 rotating together with the shaft 2 is detected by the magnetic sensor 3, for example a Hall sensor or a magneto-resistive sensor, as they are well-known in prior art, and converted into sine and cosine signals which are forwarded to a decoding electronics, possibly after an interpolation processing. The signals provided by the magnetic sensor 3 as well as the signals provided by the optical sensor 4 can be input into a decoding electronics, for example one or more processors, as electrical analogous signals or, after corresponding processing within the respective sensor means, as digitalized data. The data of the magnetic sensor 3 are here supplied to a channel of the decoding electronics, and the data of the optical sensor 4 are supplied to another channel of the decoding electronics. The decoding electronics thus obtains data about the angle of rotation of the shaft acquired in completely different manners (optically or magnetically) which are completely independent of each other.

Figure 2:
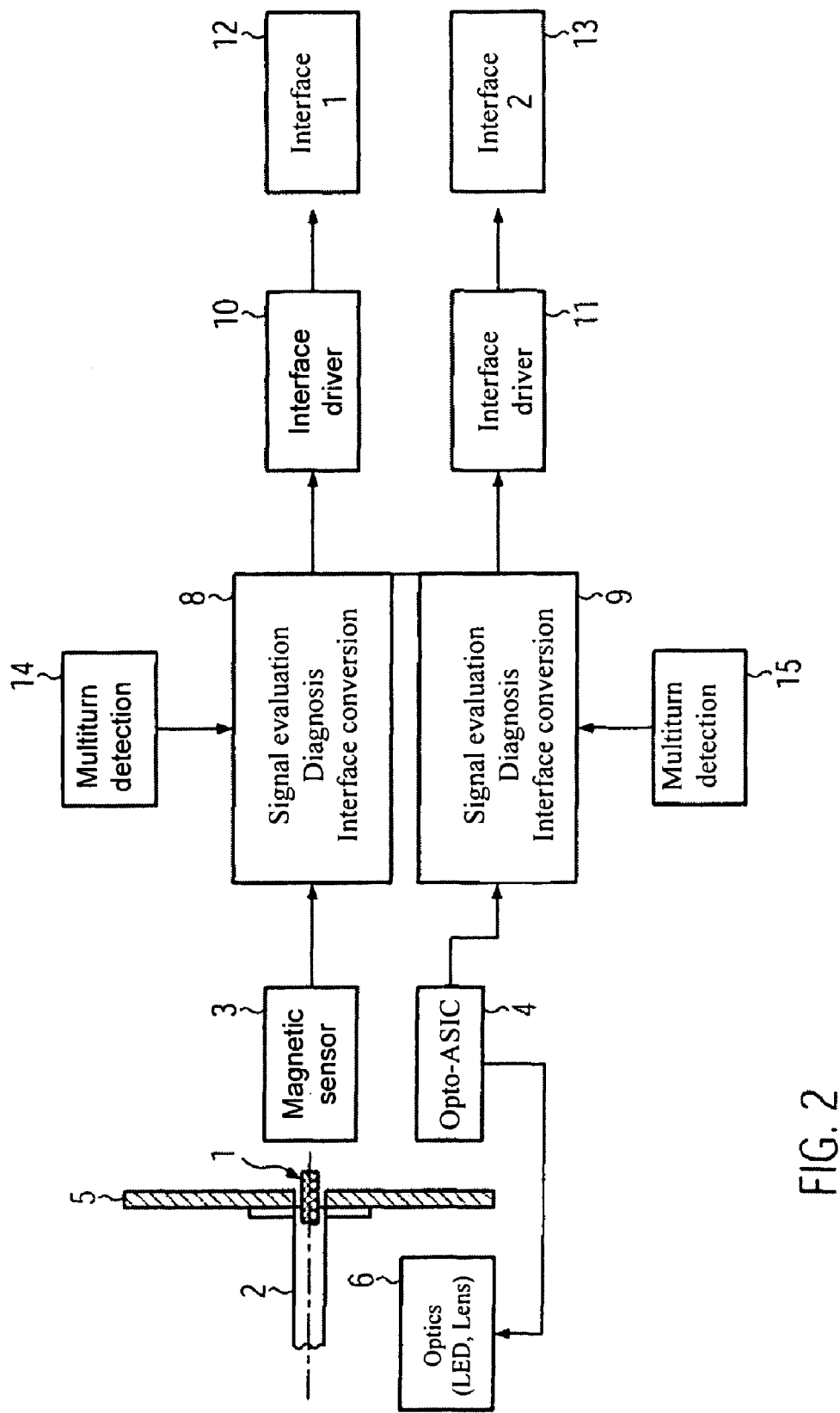
FIG. 2 shows a block diagram of a shaft encoder with two-channel sampling according to the present invention.

The data flow according to an example of the shaft encoder device disclosed herein is illustrated in FIG. 2. According to the invention, the rotation of the shaft 2 is sampled by means of a magnetic sensor 3 as well as of an optical sensor 4. The optical sensor comprises, as in the example of FIG. 1, an electric circuit that can be specified according to the requirements of a user (Opto-ASIC). Different from the example shown in FIG. 1, in the embodiment shown in FIG. 2 the optical and magnetic sensory mechanisms are not arranged one behind the other (in the direction of the shaft), but they are compactly arranged in parallel. Moreover, the magnet 1 fixed to the shaft partly extends through the encoder disk 5 fixed to the shaft 2.

The data obtained from the magnetic sensor 3 are input into a first processing unit 8, and the data obtained from the optical sensor 4 are input into a second processing unit 9. The first 8 and the second 9 processing units each comprise a signal evaluation unit, a diagnostic unit as well as a unit for converting the data of the signal evaluation for one interface driver 10 or 11 each. The interface drivers 10 and 11 each control one interface 12 or 13, respectively, with the data of the unit for converting the data of the signal evaluation.

That means, the channels for the signal acquisition, accomplished on the one hand by the magnetic sensor 3 and on the other hand by the optical sensor 4, the signal processing in the processing units 8 and 9 as well as the signal output to the interfaces 12 and 13 via the interface drivers 10 and 11 is effected completely separately. An error or failure of one of the channels can thus be compensated, at least temporarily, by the function of the other one of the channels. It should be moreover noted that the supply voltage for the two channels can be provided separately from each other.

Each of the channels can additionally comprise multiturn acquisition means 14, 15 for the determination of angular rotations by more than 360° (that means on the one hand magnetically and on the other hand optically). Alternatively, one single multiturn acquisition means (magnetic or optical) can provide the processing unit 8 as well as the processing unit 9 with information about the number of complete rotations of the shaft 2. It will be understood that the multiturn acquisition means 14 and/or the multiturn acquisition means 15 can be embodied as part of the processing unit 8 or the processing unit 9, respectively. Moreover, the processing units 8 and 9 can be realized in the form of a computer unit on which suited software for data processing can be run.

The configuration of the interface drivers 11 and 12 and/or the interfaces 12 and 13 can be variably adjusted to the requirements of the user. In particular, they can be configured in view of a connection to safety systems using profibus, and the bus supported profinet safety system, etc.

Moreover, several interface drivers and interfaces, e.g. two interface drivers and interfaces for each data processing unit 8, 9 can be provided in each channel. The interfaces can be analogous, digital or radio interfaces. The digital interfaces can be embodied as parallel or serial interfaces, SSI. Here, field buses, e.g. CANOPEN, profibus or a Real Time ETHERNET, such as ProfiNet, ProfiSave, can be employed.

The invention claimed is:

1. Shaft encoder device for sampling a shaft, comprising
    a magnetic sensor device designed to detect the magnetic field of a magnetic field generating device stationary with respect to the shaft;
    a light source;
    an optical sensor device designed to detect light emitted from the light source and reflected or transmitted by an encoder disk stationary with respect to the shaft;
    signal processing means designed to receive first data from the magnetic sensor means and second data from the optical sensor means, and to determine the angle of rotation of the shaft from the received first data, and/or to determine the angle of rotation of the shaft from the received second data;
    selection means designed to cause the signal processing means to detect the angle of rotation of the shaft selectively from the received first data and/or the received second data; and
    operational conditions determining means designed to obtain operational conditions data by which the selection means can be controlled;
    wherein the operational conditions determining means is designed such that it obtains the operational conditions data from a comparison of the angle of rotation determined from the first data and the angle of rotation determined from the second data.

2. Shaft encoder device according to claim 1, in which the signal processing means determines an angle of rotation relative with respect to an original angular position of the shaft and/or an angle of rotation of the shaft absolute with respect to an original angular position of the shaft.

3. Shaft encoder device according to claim 1, further comprising a housing in which the magnetic sensor means as well as the optical sensor means are arranged.

4. Shaft encoder device according to claim 1, wherein the selection means is designed to cause the signal processing means, on the basis of determined operating states to determine the angle of rotation of the shaft selectively from the received first data and/or the received second data; and
    wherein the determined operating states are selected from the group consisting of the temperature, the supply voltage, and the operating time of at least the magnetic sensor means or the optical sensor means.

5. Shaft encoder device according to claim 1, in which the selection means is designed to cause the signal processing means to determine the angle of rotation of the shaft by averaging the received first data and the received second data.

6. Shaft encoder device according to claim 1, in which the selection means is designed to cause the signal processing means to carry out an averaging of the angle of rotation of the shaft determined from the received first data and the angle of rotation of the shaft determined from the received second data.

7. Shaft encoder device according to claim 6, in which averaging is performed by means of weighting, and the selection means or the signal processing means is designed to adjust the weights according to the operational conditions data obtained by the operational conditions determining means.

8. Shaft encoder device for sampling a shaft, comprising
    a magnetic sensor device designed to detect the magnetic field of a magnetic field generating device stationary with respect to the shaft;
    a light source;

an optical sensor device designed to detect light emitted from the light source and reflected or transmitted by an encoder disk stationary with respect to the shaft;

signal processing means designed to receive first data from the magnetic sensor means and second data from the optical sensor means, and to determine the angle of rotation of the shaft from the received first data, and/or to determine the angle of rotation of the shaft from the received second data; and selection means designed to cause the signal processing means to detect the angle of rotation of the shaft selectively from the received first data and/or the received second data;

wherein the selection means is designed to cause the signal processing means, on the basis of determined operating states to determine the angle of rotation of the shaft selectively from the received first data and/or the received second data; and wherein the determined operating states are selected from the group consisting of the temperature, the supply voltage, and the operating time of at least the magnetic sensor means or the optical sensor means.

* * * * *